United States Patent [19]

Shay et al.

[11] Patent Number: 4,514,552

[45] Date of Patent: Apr. 30, 1985

[54] ALKALI SOLUBLE LATEX THICKENERS

[75] Inventors: Gregory D. Shay, Oak Forest; Emmojean Eldridge, Chicago; James E. Kail, Arlington Heights, all of Ill.

[73] Assignee: DeSoto, Inc., Des Plaines, Ill.

[21] Appl. No.: 643,370

[22] Filed: Aug. 23, 1984

[51] Int. Cl.$^3$ ............................................ C08F 220/34
[52] U.S. Cl. .................................... 526/301; 524/555; 524/813
[58] Field of Search ................. 526/301; 524/555, 813

*Primary Examiner*—Paul R. Michl
*Assistant Examiner*—Alex H. Walker
*Attorney, Agent, or Firm*—Dressler, Goldsmith, Shore, Sutker & Milnamow, Ltd.

[57] ABSTRACT

Alkali soluble thickeners are disclosed which are aqueous emulsion copolymers of:

(A) about 20–70 weight percent of an alpha, beta-monoethylenically unsaturated carboxylic acid, typically methacrylic acid;

(B) about 20–80 weight percent of a monoethylenically unsaturated monomer lacking surfactant capacity, typically ethyl acrylate;

(C) about 0.5–60 weight percent of a nonionic urethane monomer which is the urethane reaction product of a monohydric nonionic surfactant with a monoethylenically unsaturated monoisocyanate, preferably one lacking ester groups like alpha, alpha-dimethyl-m-isopropenyl benzyl isocyanate; and (D) from 0 up to about 2 weight percent of a polyethylenically unsaturated monomer. These emulsion copolymers are solubilized in water with the aid of an alkali, like ammonium hydroxide. When the copolymers are added to latex paints and neutralized, the viscosity of the paint is increased, brush drag is increased, and the paint rheology is otherwise improved.

13 Claims, No Drawings

ALKALI SOLUBLE LATEX THICKENERS

DESCRIPTION

1. Technical Field

This invention relates to latex polymers which are soluble in aqueous alkaline medium to provide thickeners for use in aqueous coating compositions, especially latex paints.

2. Background Art

Thickeners for aqueous systems are needed for various purposes, but they are particularly needed in aqueous latex paints to improve the rheology of the paint. Hydroxyethyl cellulose is a well known thickener for aqueous systems, but it has various deficiencies in that excessive amounts must be used and the rheology of the thickened system is inadequate. Various ethoxylated carboxyl-functional polymers which form alkali soluble thickeners are also known, but these have various deficiencies, including inadequate hydrolytic stability.

From the standpoint of alkali soluble thickeners which are carboxyl-functional emulsion copolymers, reference is made to U.S. Pat. No. 4,384,096 issued May 17, 1983. In that patent, 15–60 weight percent of a monoethylenic carboxylic acid is copolymerized in aqueous emulsion with 15–80 weight percent of a monoethylenic monomer, typified by a monovinyl ester, and 1–30 weight percent of a nonionic vinyl surfactant ester which is an ester of a nonionic ethoxylate surfactant with an acrylic or methacrylic acid. These copolymers are soluble in water with the aid of an alkali to form a thickener in the water solution.

Another prior patent of interest to this invention is U.S. Pat. No. 4,079,028 issued June 27, 1978 in which the thickener is a nonionic polyurethane of various types, but these do not provide their thickening characteristics as a result of alkali solubilization.

It has long been desired to provide superior thickeners for aqueous systems which are highly efficient, which better resist hydrolysis, and which provide better rheology. This is achieved herein by providing new alkali soluble anionic latex polymers which possess these desired characteristics.

DISCLOSURE OF INVENTION

In accordance with this invention, the alkali soluble thickener is an aqueous emulsion copolymer of:

(A) about 20–70, preferably 25–55, weight percent of an alpha, beta-monoethylenically unsaturated carboxylic acid, typically methacrylic acid;

(B) about 20–80, preferably 30–65, weight percent of a monoethylenically unsaturated monomer lacking surfactant capacity, typically ethyl acrylate; and (C) about 0.5–60, preferably 10–50, weight percent of a nonionic urethane monomer which is the urethane reaction product of a monohydric nonionic surfactant with a monoethylenically unsaturated monoisocyanate, preferably one lacking ester groups like alpha, alpha-dimethyl-m-isopropenyl benzyl isocyanate. The monohydric nonionic surfactants are themselves well known and are usually ethoxylated hydrophobes containing adducted ethylene oxide to provide the hydrophilic portion of the molecule. The hydrophobes are usually an aliphatic alcohol or alkyl phenol in which a carbon chain containing at least 6 carbon atoms provides the hydrophobic portion of the surfactant. These surfactants are illustrated by ethylene oxide adducts of dodecyl alcohol or octyl or nonyl phenol which are available in commerce and which contain about 5 to about 150, preferably 10 to 60 moles of ethylene oxide per mole of hydrophobe; and (D) from 0 up to about 2 weight percent of a polyethylenically unsaturated monomer may be copolymerized into the copolymer, as is common in alkali soluble emulsion copolymers. These are illustrated by ethylene glycol diacrylate or dimethacrylate 1,6-hexanediol diacrylate or dimethylacrylate, diallyl benzene, and the like.

The preferred surfactants have the formula:

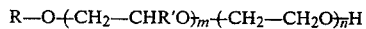

in which R is an alkyl group containing 6–22 carbon atoms (typically dodecyl) or an alkaryl group containing 8–22 carbon atoms (typically octyl phenol), R' is $C_1$–$C_4$ alkyl (typically methyl), n is an average number from about 6–150, and m is an average number of from 0–50 provided n is at least as great as m and $n+m=6$–150; and It will be understood that urethanes can be made by various procedures, so the urethane reaction product used herein can be made in any desired fashion so long as the resulting product is essentially the same as that made by the reaction of the components named herein.

The thickeners of this invention possess structural attributes of two entirely different types of thickeners (those which thicken by alkali solubilization of a high molecular weight entity, and those which thicken due to association), and this may account for the superior thickener properties which are obtained herein. On the other hand, the ethoxylated monomer thickeners of this invention are not esters with unsaturated acids, as required in U.S. Pat. No. 4,384,096, and they do not have any of the diverse structures described by U.S. Pat. No. 4,079,028.

Considering the components which are copolymerized in aqueous emulsion in this invention, a large proportion of carboxylic acid monomer must be present, as previously defined. Various carboxylic acid monomers can be used, such as acrylic acid, methacrylic acid, itaconic acid, maleic acid, and the like. Methacrylic acid is presently preferred. This large proportion of acid is essential to provide a polymeric structure which will solubilize and provide a thickener when reacted with an alkali, like sodium hydroxide.

The polymer must also contain a significant proportion, as previously defined, of a monoethylenic monomer which has no surfactant characteristic. The preferred monomers provide water insoluble polymers when homopolymerized and are illustrated by acrylate and methacrylate esters, such as ethyl acrylate, butyl acrylate or the corresponding methacrylate. Other monomers which can be used are styrene, vinyl toluene, vinyl acetate, acrylonitrile, vinylidene chloride, and the like. Nonreactive monomers are preferred, these being monomers in which the single ethylenic group is the only group reactive under the conditions of polymerization. However, monomers which include groups reactive under baking conditions may be used in some situations, like hydroxyethyl acrylate. The selection of these monomers is no different in this invention than it was in the prior art noted previously.

The monohydric nonionic surfactant component is subject to considerable variation within the formula presented previously. The essence of the surfactant is a hydrophobe carrying a polyethoxylate chain (which may include some polypropoxylate groups) and which is terminated with a single hydroxy group. When the hydroxy-terminated polyethoxylate used herein is reacted with a monoethylenically unsaturated monoisocyanate, as has been illustrated, the result is a monoethylenically unsaturated urethane in which a polyethoxylate structure is associated with a copolymerizable monoethylenic group via a urethane linkage. In this invention it has been found that alkali soluble polycarboxylic acid thickeners provide superior thickening action when urethane linkages are present even though the primary thickening mechanism is alkali solubilization of a polycarboxylic acid emulsion copolymer. At the same time, the hydrolytic stability of the urethane group is superior to the hydrolytic stability of the prior art ester group, and when preferred urethane monomers are used, this provides a further advantage in aqueous alkaline mediums as found in aqueous coating compositions, which are normally stored for long periods of time prior to use.

The monoethylenically unsaturated monoisocyanate used to provide the nonionic urethane monomer is subject to wide variation. Any copolymerizable unsaturation may be employed, such as acrylate and methacrylate unsaturation. One may also use allylic unsaturation, as provided by allyl alcohol. These, preferably in the form of an hydroxy-functional derivative, as is obtained by reacting a $C_2$–$C_4$ monoepoxide, like ethylene oxide, propylene oxide or butylene oxide, with acrylic or methacrylic acid to form an hydroxy ester, are reacted in equimolar proportions with an organic diisocyanate, such as toluene diisocyanate or isophorone diisocyanate. The presently preferred monoethylenic monoisocyanate is styryl, as in alpha, alpha-dimethyl-m-isopropenyl benzyl isocyanate, and this unsaturated monoisocyanate lacks the ester group so it forms urethanes which lack this group.

The aqueous emulsion copolymerization is entirely conventional and will be illustrated in the examples. To obtain an estimate of thickening efficiency, the latex product can be diluted with water to about 1% solids content and then neutralized with alkali. The usual alkali is ammonium hydroxide, but sodium and potassium hydroxide, and even amines, like triethyl amine, may be used for neutralization. The neutralized product dissolves in the water to provide an increase in the viscosity. In the normal mode of addition, the unneutralized latex thickener is added to a paint and then neutralized. This facilitates handling the thickener because it has a lower viscosity before neutralization. This procedure also makes more water available for the paint formulation.

The invention is illustrated by the following examples, it being understood that throughout this document, all proportions are by weight unless otherwise stated.

The following Example is illustrative of Examples 1-A through 1-L in Table I for the preparation of the nonionic urethane monomers of this invention.

EXAMPLE 1 (Preparation of a Urethane Monomer)

To a one-liter glass reactor fitted with a thermometer, heating mantle, thermoregulator, stirrer, nitrogen sparge, and condenser including a Dean-Stark trap is charged 800.0 g of a 50 mole ethoxylate of nonyl phenol as a hot melt (Igepal CO-970, a product of GAF, may be used). The reactor contents are heated, with nitrogen sparging, to 150° C. and held for two hours while trace moisture is removed and collected in the Dean-Stark Trap (typically less than 1 g).

The reactor contents are then cooled to 80° C., the Dean Stark trap is replaced with a condenser, and the nitrogen sparge is switched to an air sparge for 15 minutes. With continued air sparging, 0.02 g methoxyhydroquinone inhibitor, 0.50 g dibutyl tin dilaurate catalyst, and 99.7 g of alpha, alpha-dimethyl-m-isopropenyl benzyl isocyanate (m-TMI, a product of American Cyanamide, may be used) are charged in order to the reactor. After a rapid initial exotherm which increases the reaction temperature about 8° C., the contents are heated to maintain 80° C. for an additional two hours. The product is then cooled to room temperature.

The final product is a white wax in appearance with residual isocyanate content of 0.5% and with 98% of the original ethylenic unsaturation retained. This product is designated Example 1-D in Table I.

For purposes of comparison, the following Example is illustrative of Examples 2-A through 2-D in Table II for the preparation of an alkali-soluble thickener containing no urethane monomer. These latex thickeners display poor performance because they possess low solution viscosity, have poor thickening efficiency, and provide poor flow leveling properties in latex paints.

EXAMPLE 2 (Control)

To a three-liter flask equipped as in Example 3 hereinafter is charged 525.5 g deionized water. The water is heated to 80° C. and purged with nitrogen for 30 minutes.

A pre-emulsion of monomers is prepared in a separate stirred container by charging, in order, 756.7 g deionized water, 81.6 g sulfonated octyl phenol ethoxylate containing about 10 moles of adducted ethylene oxide per mol of the phenol (Alipal EP-110 surfactant, a product of GAF, may be used) 367.0 g ethyl acrylate, and 244.7 g methacrylic acid.

Under a nitrogen blanket, 145.0 g (10%) of the monomer pre-emulsion is charged to the reactor followed by 10.0 g of 5% sodium persulfate solution. The contents exotherm to about 85° C., and after cooling back to 80° C., the addition of the remaining pre-emulsion is started and continued over 2.5 hours until complete. The reactor contents are heated for an additional 30 minutes at 80° C. to complete conversion of monomer to copolymer and then cooled.

The product is a low viscosity latex of solids content 28.9%, RVT Brookfield viscosity 28.5 cps (No, 1 spindle at 100 rpm), pH of 2.8, and average particle size of 129 nm. Upon ammonium hydroxide neutralization to pH 9 of a 1% active concentration of this latex in water, a clear solution is obtained with RVT Brookfield viscosity of only 60 cps (No. 1 spindle at 10 rpm). This latex thickener is designated 2-C in Table II.

The following Example is illustrative of Examples 3-A through 3-U and 4–19 in Tables II and III for alkali-soluble thickeners prepared from the urethane monomers of this invention in Table I.

EXAMPLE 3 (Preparation of an Alkali-Soluble Thickener with Urethane Monomer)

To a three-liter flask equipped with thermometer, stirrer, condenser, nitrogen inlet, thermoregulated water bath and monomer addition pump is charged 525.5 g deionized water. The water is heated to 80° C. and purged with nitrogen for 30 minutes.

A pre-emulsion of monomers is prepared in a separate stirred container by charging, in order, 756.7 g deionized water, 81.6 g sulfonated octyl phenol ethoxylate containing about 10 moles of adducted ethylene oxide per mol of the phenol (Alipal EP-110 surfactant, a product of GAF, may be used) and a monomer blend consisting of 305.8 g ethyl acrylate, 244.7 g methacrylic acid, and 61.2 g of the ethoxylated urethane monomer prepared in Example 1.

Under a nitrogen blanket, 145.0 g (10%) of the monomer pre-emulsion is charged to the reactor followed by 10 g of 5% sodium persulfate solution. The contents exotherm to about 85° C., and after cooling back to 80° C., the addition of the remaining pre-emulsion is started and continued progressively over 2.5 hours until complete. The reactor contents are heated for an additional 30 minutes at 80° C. to complete the conversion of monomer to copolymer and then cooled.

The product is a low viscosity latex of solids content 29.2%, RVT Brookfield viscosity 26.8 cps (No. 1 spindle at 100 rpm), pH of 2.9, and average particle size of 92 nm. Upon neutralization to pH 9 with ammonium hydroxide of a 1% active concentration of this latex in water, a clear solution is obtained with RVT Brookfield viscosity of 1375 cps (No. 3 spindle at 10 rpm).

TABLE I

EXAMPLES OF NOVEL URETHANE MONOMERS REACTANTS

| Example No. | Mono-Isocyanate Used | Ethoxylated Surfactant Used Hydrophobe | Ethylene oxide (Moles) |
|---|---|---|---|
| 1-A | M—TMI | Nonyl-Phenol | 9 |
| 1-B | M—TMI | Nonyl-Phenol | 15 |
| 1-C | M—TMI | Nonyl-Phenol | 30 |
| 1-D | M—TMI | Nonyl-Phenol | 50 |
| 1-E | M—TMI | Nonyl-Phenol | 100 |
| 1-F | M—TMI | Octyl-Phenol | 40 |
| 1-G | M—TMI | Dinonyl-Phenol | 49 |
| 1-H | M—TMI | Dinonyl-Phenol | 150 |
| 1-I | M—TMI | Lauryl (C12) | 23 |
| 1-J | M—TMI | Stearyl (C18) | 30 |
| 1-K | M—TMI | Oleyl (C-18) | 20 |
| 1-L | IEM | Nonyl-Phenol | 50 |

The surfactants used in the above Table are:

| Example No. | Trade Name |
|---|---|
| 1-A | Igepal CO-630 |
| 1-B | Igepal CO-730 |
| 1-C | Igepal CO-880 |
| 1-D | Igepal CO-970 |
| 1-E | Igepal CO-990 |
| 1-F | Igepal CA-890 |
| 1-G | Igepal DM-880 |
| 1-H | Igepal DM-970 |
| 1-I | Siponic L-25 |
| 1-J | Siponic E-15 |
| 1-K | Emulphor ON-870 |
| 1-L | Igepal CO-970 |

The abbreviations used in the above Table are:
M—TMI = Alpha, alpha-dimethyl-m-isopropenyl benzyl isocyanate
IEM = Isocyanatoethyl methacrylate
Igepal and Emulphor are trademarks of GAF Corporation
Siponic is a trademark of Alcolac

TABLE II

PREPARATIONS OF ALKALI-SOLUBLE LATEX THICKENERS USING EXAMPLE 1-D URETHANE MONOMER

| Example (No.) | Thickener Monomer Composition ||| 1% Aqueous Solution Viscosity at PH 9 (CPS) | Properties In An Interior Flat Paint |||
|---|---|---|---|---|---|---|---|
| | Urethane Monomer (Wt. %) | Ethyl Acrylate (Wt. %) | Methacrylic Acid (Wt. %) | | Thickening Efficiency (Dry Lbs*) | Brush Drag Viscosity (Poise) | Leveling Viscosity (Poise) |
| 2-A | None | 25 | 75 | 52 | 32.42 | 1.85 | 3523 |
| 2-B | None | 40 | 60 | 70 | 20.52 | 2.17 | 3555 |
| 2-C | None | 55 | 45 | 96 | 22.48 | 2.39 | 2607 |
| 2-D | None | 70 | 30 | 220 | 23.04 | 2.43 | 3444 |
| 3-A | 5 | 45 | 50 | 470 | 12.87 | 2.14 | 1801 |
| 3-B | 5 | 50 | 45 | 400 | 11.93 | 2.36 | 1501 |
| 3-C | 10 | 35 | 55 | 764 | 9.72 | 2.17 | 1659 |
| 3-D | 10 | 40 | 50 | 1220 | 9.00 | 2.31 | 2686 |
| 3-E | 10 | 50 | 40 | 1375 | 9.30 | 1.95 | 2686 |
| 3-F | 10 | 55 | 30 | 1553 | — | — | — |
| 3-G | 15 | 25 | 60 | 268 | 11.86 | 2.17 | 1975 |
| 3-H | 15 | 35 | 50 | 1730 | 8.01 | 2.45 | 2038 |
| 3-I | 15 | 40 | 45 | 2025 | 8.02 | 2.27 | 2449 |
| 3-J | 15 | 45 | 40 | 2140 | 7.97 | 2.10 | 2054 |
| 3-K | 15 | 55 | 30 | 2575 | 8.72 | 2.15 | 3729 |
| 3-L | 15 | 65 | 20 | 1416 | 13.50 | 1.30 | 5609 |
| 3-M | 15 | 70 | 15 | 178 | 22.34 | 1.29 | 6636 |
| 3-N | 20 | 50 | 30 | 4880 | 7.96 | 2.10 | 20.54 |
| 3-O | 25 | 30 | 45 | 3400 | — | — | — |
| 3-P | 25 | 35 | 40 | 5680 | 7.16 | 1.98 | 1975 |
| 3-Q | 25 | 40 | 35 | 7350 | — | — | — |
| 3-R | 25 | 50 | 25 | 4400 | 7.80 | 1.46 | 2528 |
| 3-S | 30 | 25 | 45 | 5180 | 6.92 | 1.53 | 1248 |
| 3-T | 30 | 40 | 30 | 6100 | 7.55 | 1.29 | 1375 |
| 3-U | 45 | 25 | 30 | 880 | 8.79 | 2.43 | 1122 |
| Cellulosic | — | — | — | 2196 | 7.00 | 0.96 | 2212 |

*Number of pounds of material which must be added to 100 gallons of latex paint to provide 92–96 KU Stormer Paint Viscosity
Cellulosic is Natrosol 250 HBR, a hydroxyethyl cellulose from Hercules Inc.

TABLE III

OTHER EXAMPLES OF ALKALI-SOLUBLE THICKENERS USING URETHANE MONOMERS FROM TABLE I

| Thickener Example (No.) | Urethane Monomer Example Used (No.) | Thickener Monomer Composition | | | 1% Aqueous Solution Viscosity at PH 9 (CPS) | Properties In An Interior Flat Paint | | |
|---|---|---|---|---|---|---|---|---|
| | | Urethane Monomer (Wt. %) | Ethyl Acrylate (Wt. %) | Methacrylic Acid (Wt. %) | | Thickening Efficiency (Dry Lbs*) | Brush Drag Viscosity (Poise) | Leveling Viscosity (Poise) |
| 4  | 1-A | 10 | 50 | 40 | 417   | 9.56  | 1.66 | 3081 |
| 5  | 1-A | 25 | 50 | 25 | 1272  | —     | —    | —    |
| 6  | 1-A | 10 | 40 | 50 | 625   | 9.85  | 1.88 | 1896 |
| 7  | 1-A | 25 | 35 | 40 | 1550  | 7.95  | 1.05 | 1722 |
| 8  | 1-B | 10 | 50 | 40 | 477   | 9.92  | 1.75 | 3160 |
| 9  | 1-C | 10 | 50 | 40 | 969   | 8.81  | 2.25 | 4266 |
| 10 | 1-E | 10 | 50 | 40 | 2256  | 10.25 | 1.82 | 6794 |
| 11 | 1-F | 10 | 50 | 40 | 1480  | 8.09  | 1.89 | 1485 |
| 12 | 1-G | 10 | 50 | 40 | 10053 | 8.52  | 2.20 | 2171 |
| 13 | 1-G | 25 | 50 | 25 | 17160 | —     | —    | —    |
| 14 | 1-G | 10 | 40 | 50 | 6680  | 6.82  | 1.31 | 2007 |
| 15 | 1-G | 25 | 35 | 40 | 29600 | 4.74  | 1.15 | 1896 |
| 16 | 1-H | 10 | 50 | 40 | 3080  | 7.73  | 1.47 | 3444 |
| 17 | 1-I | 10 | 50 | 40 | 752   | 8.52  | 2.20 | 2171 |
| 18 | 1-K | 10 | 50 | 40 | 1830  | 8.80  | 1.09 | 3350 |
| 19 | 1-L | 10 | 50 | 40 | 1066  | 9.45  | 2.04 | 1438 |

*see note in Table II.

What is claimed is:

1. An alkali soluble thickener which is an aqueous emulsion copolymer of:
   (A) about 20–70 weight percent of an alpha, beta-monoethylenically unsaturated carboxylic acid;
   (B) about 20–80 weight percent of a monoethylenically unsaturated monomer lacking surfactant capacity;
   (C) about 0.5–60 weight percent of a non-ionic urethane monomer which is the urethane reaction product of a nonohydric nonionic surfactant with a monoethylenically unsaturated monoisocyanate; and
   (D) from 0 up to about 2 weight percent of a polyethylenically unsaturated monomer.

2. An alkali soluble thickener as recited in claim 1 in which said component (C) is present in an amount of from 10–50 weight percent and said monohydric nonionic surfactant is an ethoxylated aliphatic alcohol or alkyl phenol in which a carbon chain containing at least 6 carbon atoms provides the hydrophobic portion of said surfactant.

3. An alkali soluble thickener as recited in claim 1 in which said monohydric nonionic surfactant has the formula:

$$R-O+(CH_2-CHR'O)_{\overline{m}}+(CH_2-CH_2O)_{\overline{n}}H$$

in which R is an alkyl group containing 6–22 carbon atoms or an alkaryl group containing 8–22 carbon atoms, R' is $C_1$–$C_4$ alkyl, n is an average number from about 6–150, and m is an average number of from 0–50 provided n is at least as great as m and n+m=6–150.

4. An alkali soluble thickener as recited in claim 1 in which said component (A) is present in an amount of from 25–55 weight percent.

5. An alkali soluble thickener as recited in claim 4 in which said component (A) is methacrylic acid.

6. An alkali soluble thickener as recited in claim 1 in which said component (B) is present in an amount of 30–65 weight percent.

7. An alkali soluble thickener as recited in claim 6 in which said component (B) is ethyl acrylate.

8. An alkali soluble thickener as recited in claim 1 in which said component (C) contains styryl unsaturation.

9. An alkali soluble thickener as recited in claim 8 in which said component (C) is urethane of said monohydric nonionic surfactant with alpha, alpha-dimethyl-m-isopropenyl benzyl isocyanate.

10. An alkali soluble thickener as recited in claim 1 in which said component (C) is a urethane of an ethoxylate of nonyl phenol.

11. An alkali soluble thickener as recited in claim 10 in which said ethoxylate contains about 50 moles of adducted ethylene oxide per mole of nonyl phenol.

12. An aqueous latex containing the neutralized aqueous emulsion copolymer of claim 1.

13. An aqueous latex as recited in claim 12 in which said copolymer is neutralized with ammonium hydroxide.

* * * * *